United States Patent
Iijima

[19]

[11] Patent Number: 5,986,731
[45] Date of Patent: Nov. 16, 1999

[54] LIQUID CRYSTAL DISPLAY DEVICE AND ELECTRONIC DEVICE USING SAME

[75] Inventor: Chiyoaki Iijima, Ima, Japan

[73] Assignee: Seiko Epson Corporation, Japan

[21] Appl. No.: 09/131,311

[22] Filed: Aug. 7, 1998

[30]    Foreign Application Priority Data

Aug. 7, 1997  [JP]   Japan ................................. 9-224432

[51] Int. Cl.[6] ............................................... G02F 1/1335
[52] U.S. Cl. ........................... 349/117; 349/96; 359/494
[58] Field of Search ........................... 349/96, 113, 117, 349/179; 359/487, 488, 495, 494, 500, 485

[56]              References Cited

U.S. PATENT DOCUMENTS

| | | | |
|---|---|---|---|
| 5,684,551 | 11/1997 | Nakamura et al. | 349/117 |
| 5,828,488 | 10/1998 | Ouderkirk et al. | 359/487 |

FOREIGN PATENT DOCUMENTS

| | | |
|---|---|---|
| WO95/17303 | 6/1995 | WIPO . |
| WO95/17691 | 6/1995 | WIPO . |
| WO95/17692 | 6/1995 | WIPO . |
| WO95/17699 | 6/1995 | WIPO . |
| WO95/27919 | 10/1995 | WIPO . |
| WO96/19347 | 6/1996 | WIPO . |
| WO97/01439 | 1/1997 | WIPO . |
| WO97/01440 | 1/1997 | WIPO . |
| WO97/01610 | 1/1997 | WIPO . |
| WO97/01726 | 1/1997 | WIPO . |
| WO97/01774 | 1/1997 | WIPO . |
| WO97/01778 | 1/1997 | WIPO . |
| WO97/01780 | 1/1997 | WIPO . |
| WO97/01781 | 1/1997 | WIPO . |
| WO97/01788 | 1/1997 | WIPO . |
| WO97/01789 | 1/1997 | WIPO . |
| WO97/07653 | 2/1997 | WIPO . |

*Primary Examiner*—Hung Xuan Dang
*Assistant Examiner*—Tai V. Duong
*Attorney, Agent, or Firm*—Harness, Dickey & Pierce, P.L.C.

[57]              ABSTRACT

The present invention relates to a liquid crystal display device, particularly a liquid crystal display device provided with a retardation film, and an electronic device using the same, and provides a liquid crystal display device which satisfactorily and certainly eliminates coloring in the ON-state as well as in the OFF-state and gives a good contrast, and an electronic device using the same. The invention provides a liquid crystal display device comprising a liquid crystal display panel having a liquid crystal layer and a retardation film for eliminating coloring caused on the liquid crystal display panel; wherein a polarized light separator comprising a first film having birefringence and a second film not having birefringence is arranged at least on one side of the liquid crystal display panel; the ratio $B_{LC}/B_{RF}$ of the wavelength dispersion $B_{LC}$ of refractive index anisotropy in the liquid crystal display panel to the wavelength dispersion of retardation in the retardation film is at least 1.02; and the ratio $R_{450}/R_{650}$ of the reflectivity $R_{450}$ at a wavelength of 450 nm of the polarized light separator to the reflectivity $R_{650}$ at a wavelength of 650 nm is at least 1.

13 Claims, 5 Drawing Sheets

LIQUID CRYSTAL DISPLAY DEVICE AND ELECTRONIC DEVICE USING SAME

BACKGROUND OF THE INVENTION

1. Industrial Field of the Invention

The present invention relates to a liquid crystal display device, particularly one provided with a retardation film for eliminating coloring caused on the liquid crystal display panel, and an electronic device such as a watch or a portable telephone using such a liquid crystal display device.

2. Description of the Related Art

There is conventionally known a liquid crystal display device provided with a liquid crystal display panel such as an STN (Super-Twisted Nematic) liquid crystal, in which a retardation film such as a uniaxial drawn film is arranged on one side of the liquid crystal display panel (for example, see Japanese Examined Patent Publication No. 3-50249 previously proposed by the present inventors).

FIG. 9 is a descriptive view of a schematic configuration illustrating an example of the conventional liquid crystal display device provided with the retardation film as described above. In FIG. 9, 1 is an upper polarizer; 2 is a retardation film; 3 is a liquid crystal display panel; 4 is a lower polarizer; and 5 is a reflector. The liquid crystal display panel 3 has a pair of upper and lower substrates 31 and 32 holding a liquid crystal layer 33 there between.

As the above-mentioned retardation film, uniaxially drawn polymer film such as a polycarbonate film is used. Coloring produced on the liquid crystal display panel is eliminated by appropriately selecting a material and a thickness of the retardation film in response to the product of multiplication $\Delta n \cdot d$ of the anisotropy of refractive index $\Delta n$ of the liquid crystal display panel and the thickness d of the liquid crystal layer and other parameters. While FIG. 9 illustrates a reflective liquid crystal display device, a backlight is installed in place of the reflector 5 in a transmissive liquid crystal display device.

However, use of a retardation film as described above did not always ensure sufficient elimination of coloring caused by the liquid crystal display panel, and particularly, it was difficult to eliminate coloring in both the ON-state and OFF-state.

The results of extensive studies on these problems revealed that coloring was further accelerated by the reflector. More specifically, as shown in FIG. 10 illustrating spectroscopic properties of an aluminum reflector commonly in use in conventional liquid crystal display devices, reflectivity is higher in the high-wavelength region than in the low-wavelength region of the visible light region, and this is accelerating coloring.

The present invention was developed in view of these problems and has an object to provide a liquid crystal display device using a retardation film as described above, which satisfactorily and certainly eliminates coloring in the ON-state as well as in the OFF-state and gives a good contrast, and an electronic device using the same.

SUMMARY OF THE INVENTION

To achieve the above-mentioned object, the present invention provides the following liquid crystal display device and electronic device.

More particularly, the invention provides a liquid crystal display device comprising: a liquid crystal display panel having a liquid crystal layer; a polarized light separator, arranged at least on one side of the liquid crystal display panel, having a ratio $R_{450}/R_{650}$ of the reflectivity $R_{450}$ at a wavelength of 450 nm to the reflectivity $R_{650}$ at a wavelength of 650 nm of at least 1; wherein the liquid crystal display device has a retardation film for eliminating coloring occurring in the liquid crystal display panel; and the ratio of the wavelength dispersion $B_{LC}$ of anisotropy of refractive index in the liquid crystal layer to the wavelength dispersion $B_{RF}$ of retardation in the retardation film is at least 1.02.

The ratio $R_{450}/R_{650}$ should be at least 1.0, and at the same time, should preferably be up to 3. It is possible to achieve a ratio $R_{450}/R_{650}$ of at least 1 by using a polarized light separator which has a first layer having birefringence and a second layer not having birefringence, and in which the refractive index on one side of the first layer is substantially equal to the refractive index of the second layer. A liquid crystal display panel having a nematic liquid crystal layer twist-aligned by an angle within a range of from 180 to 360° may be used. As a retardation film, a polymer film such as a uniaxially drawn film may be employed. A reflector may be provided on a side of the liquid crystal display panel opposite to the polarized light separator.

The invention provides also an electronic device having a liquid crystal display device as the display section thereof, the liquid crystal display device comprising: a liquid crystal display panel having a liquid crystal layer; a polarized light separator, arranged at least on one side of the liquid crystal display panel, having a ratio $R_{450}/R_{650}$ of the reflectivity $R_{450}$ at a wavelength of 450 mn to the reflectivity $R_{650}$ at a wavelength of 650 nm of at least 1; wherein the liquid crystal display device has a retardation film for eliminating coloring occurring in the liquid crystal display panel; and the ratio of the wavelength dispersion $B_{LC}$ of anisotropy of refractive index in the liquid crystal layer to the wavelength dispersion $B_{RF}$ of retardation in the retardation film is at least 1.02.

In the liquid crystal display device provided with the retardation film as described above, a display of a good contrast is available by achieving a ratio of the wavelength dispersion $B_{LC}$ of anisotropy of refractive index in the liquid crystal layer to the wavelength dispersion $B_{RF}$ of retardation in the retardation film of at least 1.02. At the same time, coloring as described above can be satisfactorily eliminated by providing a first layer having birefringence and a second layer not having birefringence, and achieving a ratio $R_{450}/R_{650}$ of the reflectivity $R_{450}$ at a wavelength of 450 nm to the reflectivity $R_{650}$ at a wavelength of 650 nm of at least 1.

DETAILED DESCRIPTION OF THE PREFERRED EMBODIMENTS

The liquid crystal display device and the electronic device of the invention will now be described by means of preferred embodiments.

Figure 1:
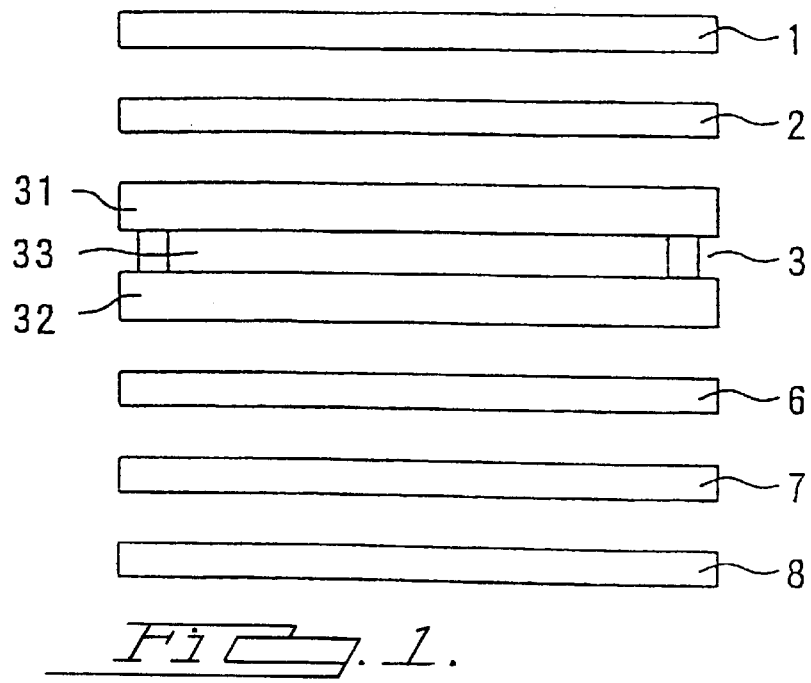
FIG. 1 is a side view of a schematic configuration illustrating an embodiment of the liquid crystal display device of the present invention.

FIG. 1 is a side view of a schematic configuration illustrating an embodiment of the liquid crystal display device of the invention. In FIG. 1, 1 is an upper polarizer; 2 is a retardation film; and 3 is a liquid crystal display panel. The liquid crystal panel 3 comprises a pair of upper and lower substrates 31 and 32 with a liquid crystal layer 33 there between. On the sides of the substrates 31 and 32 facing the liquid crystal panel 33, there are provided transparent electrodes made of ITO (Indium Tin Oxide) or tin oxide, respectively, which are not shown. A diffusing plate 6, a polarized light separator 7 and a light absorber 8 are sequentially arranged on the lower surface of the liquid crystal display panel 3.

A conventionally known polarizer can be used as the above-mentioned upper polarizer 1. The retardation film 2 serves as an optical anisotrope for color compensation for eliminating coloring occurring on the liquid crystal display panel 3 applicable materials for this purpose include uniaxial drawn films of PC (polycarbonate), PVA (polyvinyl alcohol), PA (polyarylate) and PSF (polysulfon).

Figure 2:
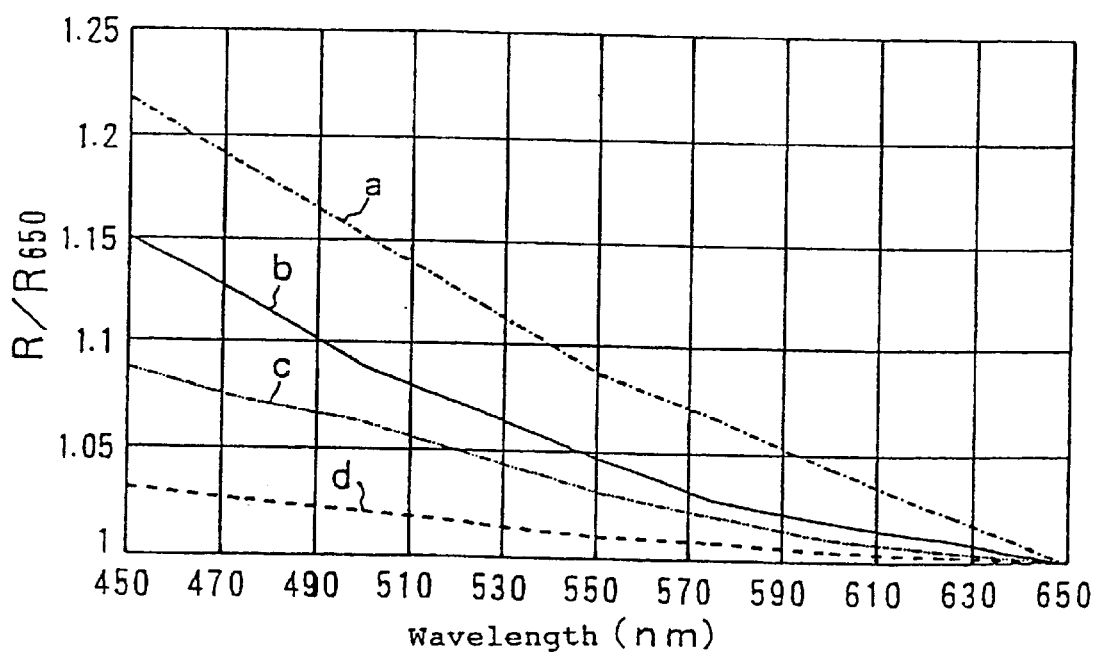
FIG. 2 is a graph illustrating wavelength dispersion of various retardation films.

FIG. 2 illustrates ratios of retardation R ($\Delta n \cdot d$) for the individual wavelengths to retardation $R_{650}$ ($\Delta n \cdot d_{650}$) at a wavelength 650 nm when using the above-listed films as the retardation films. In FIG. 2, a is PSF, b is PA, c is PC, and d is PVA. For all these films a to d, a longer wavelength corresponds to a smaller retardation R.

As the liquid crystal display panel 3, any TN-types and STN-types are appropriately applicable. Among others, an STN-type, particularly an STN-type nematic liquid crystal having liquid crystal molecules twist-aligned by an angle within a range of from 180 to 360° can suitably be used. In the present embodiment, an STN-type liquid crystal is employed.

Figure 3:
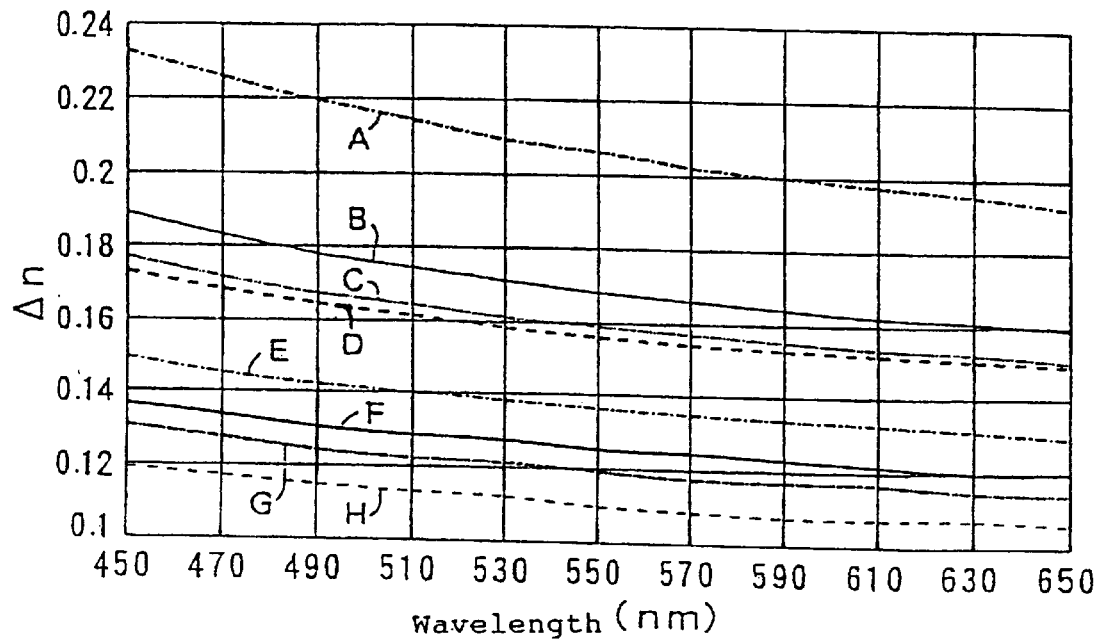
FIG. 3 is a graph illustrating refractive index anisotropy for each wavelength of various liquid crystals.
Figure 4:
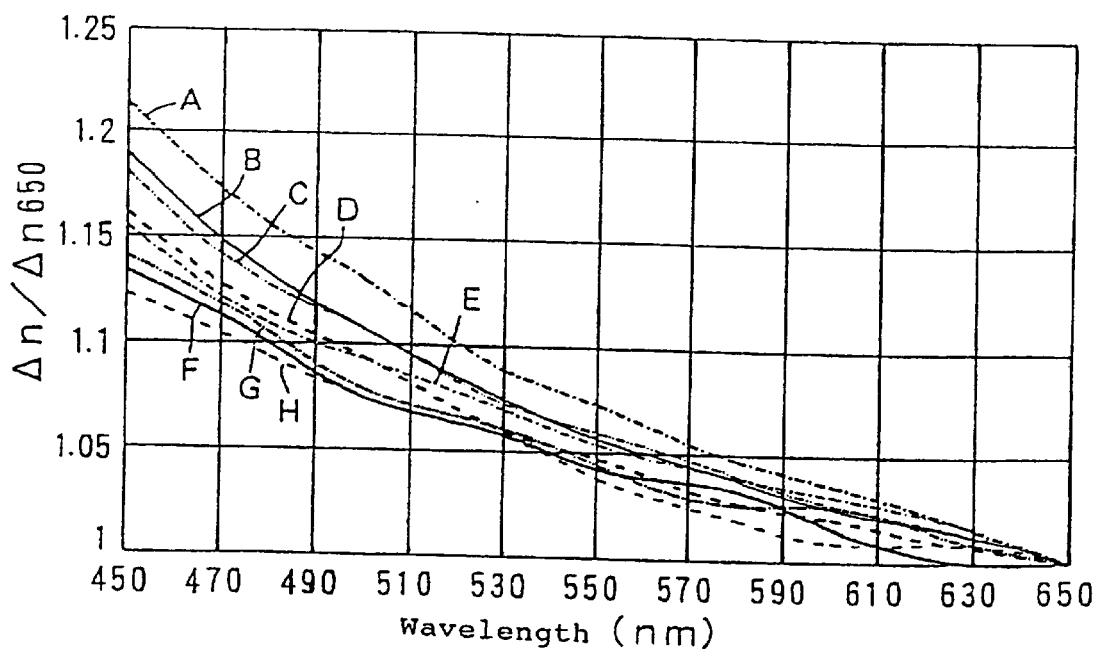
FIG. 4 is a graph illustrating wavelength dispersion of various liquid crystals.

FIG. 3 illustrates values of anisotropy of refractive index $\Delta n$ for the individual wavelengths of a plurality of kinds of liquid crystals A to H popularly used for liquid crystal display devices of this type; and FIG. 4 is a graph illustrating the ratio of anisotropy of refractive index $\Delta n$ of the individual wavelengths relative to the anisotropy of refractive index $\Delta n_{650}$ at a wavelength of 650 nm for the above-mentioned liquid crystals A to H. For any of the liquid crystals shown in FIGS. 3 and 4, a longer wavelength corresponds to a smaller anisotropy of refractive index $\Delta n$.

In the present invention, the ratio $B_{LC}/B_{RF}$ of the wavelength dispersion $B_{LC}$ of anisotropy of refractive index $\Delta n$ in the liquid crystal layer to the wavelength dispersion $B_{RF}$ of retardation in the retardation film 2 should be at least 1.02. The wavelength dispersion $B_{LC}$ of anisotropy of refractive index $\Delta n$ in the liquid crystal layer means the ratio $\Delta n_{450}/\Delta n_{650}$ of the anisotropy of refractive index $\Delta n_{450}$ at a wavelength of 450 nm in the liquid crystal to the anisotropy of refractive index $\Delta n_{650}$ at a wavelength of 650 nm. The wavelength dispersion $B_{RF}$ means the ratio $R_{450}/R_{650}$ of the retardation $R_{450}$ ($\Delta n \cdot d_{450}$) at a wavelength of 450 nm in the retardation film 2 to the retardation $R_{650}$ ($\Delta n \cdot d_{650}$) at a wavelength of 650 nm.

A display of a good contrast is available by achieving a ratio $B_{LC}/B_{RF}$ of at least 1.02 of the wavelength dispersion $B_{LC}$ of anisotropy of refractive index $\Delta n$ in the liquid crystal layer of the liquid crystal display panel 3 to the wavelength dispersion $B_{RF}$ of retardation in the retardation film 2. More preferably, the above-mentioned ratio $B_{LC}/B_{RF}$ should be at least 1.04, and it is possible to further improve contrast.

As the above-mentioned diffusing plate 6, for example, a milk-white acrylic plate may be used. In place of the diffusing plate 6, there may be provided a diffusing layer incorporating a diffusing agent kneaded in an adhesive, and this diffusing layer may the liquid crystal display panel to the polarized light separator, in addition to the diffusion effect. Under the effect of the diffusing plate 6 or the diffusing layer, it is possible to achieve a white display, not a mirror-like display. However, the diffusing plate 6 may also be omitted.

Figure 5:
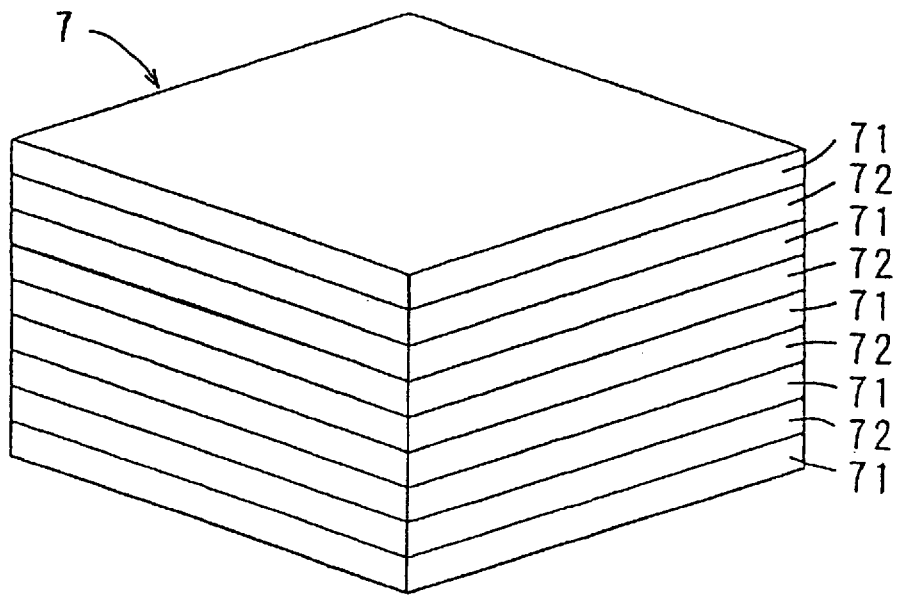
FIG. 5 is a perspective view illustrating a configuration of the polarized light separator.

The above-mentioned polarized light separator 7 comprises a sequential lamination of a desired number of first films 71 having birefringence and of second films 72 not having birefringence, as shown in FIG. 5. Materials for the first and the second films may be appropriately selected, but both films should have light transmissivity, and the refractive index of the second film not having birefringence should substantially be equal to the refractive index of any of the first films having birefringence.

Figure 6:
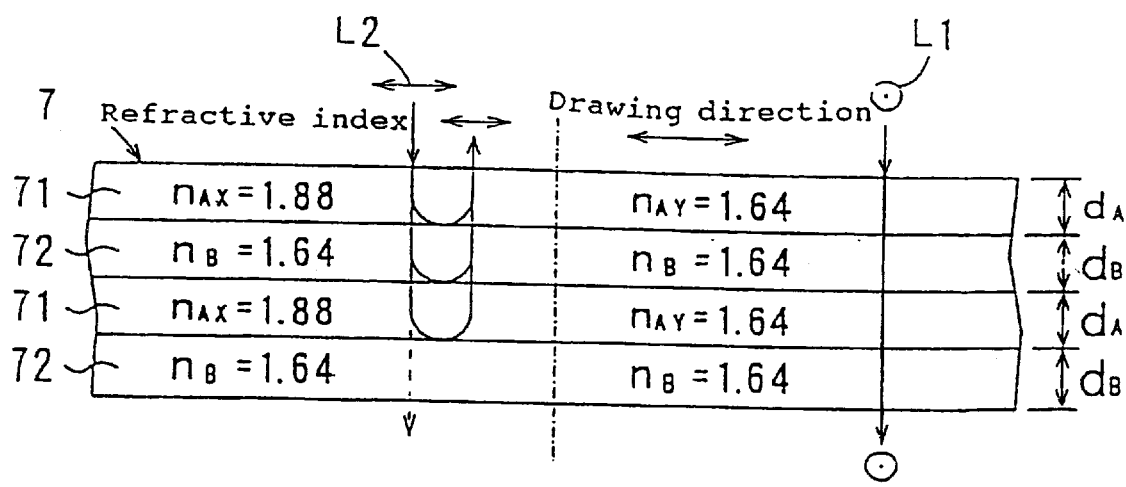
FIG. 6 is a side view illustrating the principle of the polarized light separator.

Referring now to FIG. 6, the first film 71 comprises, for example, polyethylene naphthalate (PEN) drawn to desired magnifications. As the second film 72, copolyester of naphthalene dicarboxylic acid and terephthalic or isothalic acid (coPEN) may be used. The polarization in the drawing direction of the first film 71 has a refractive index $n_{AX}$ of 1.88, and the polarization in a direction at right angles to the drawing direction has a refractive index $n_{AY}$ of 1.64. The second film 72 has a refractive index $n_B$ of 1.64.

In the polarized light separator 7 formed by laminating the first films 71 having birefringence and the second films 72 not having birefringence, as described above, for example, when a light enters the separator 7 from above, a light L1 in a direction at right angles to the drawing direction passes through the polarized light separator 7 because there is no interface of refractive index between the first and the second films 71 and 72. Of a light L2 in a direction in parallel with the drawing direction, only a prescribed wavelength is selectively reflected at the interface between the first and the second films, and the rest of the light L2 passes through the same. The wavelength $\lambda a$ of the reflected light L2 depends upon the refractive index values $n_{AX}$ and $n_B$ (where $n_B = n_{AY}$) of the first and the second films 71 and 72 and the thickness values dA and dB of the films 71 and 72.

These relations can be expressed by the following formulae (1) and (2):

$$n_{AX} \cdot d_A = (\tfrac{1}{4} + m/2)\lambda \tag{1}$$

$$n_B \cdot d_B = (\tfrac{1}{4} + m/2)\lambda \tag{2}$$

where m is 0 or a positive integer.

By appropriately selecting values of refractive index $n_{AX}$ and $n_B$ of the first and the second films 71 and 72 and thickness $d_A$ and $d_B$ of the films 71 and 72, therefore, it is possible to cause reflection of the light of a desired wavelength. It is possible to cause reflection of the light of a desired wavelength also by appropriately selecting any of the refractive index and the thickness, i.e., for example, by selecting appropriate values of thickness $d_A$ and $d_B$ with constant values of refractive index $n_{AX}$ and $n_B$. Lamination of a plurality of first and second films having different thicknesses also permits reflection within a desired wavelength band. In this case, reflectivity of wavelength is higher as the number of the first and the second films is larger. A desired reflectivity can be set for each wavelength by appropriately selecting this number. Such a polarized light separator is disclosed as a reflective polarizer in International Unexamined Patent Publication WO/95/17692 and others.

In the invention, the ratio $R_{450}/R_{650}$ of reflectivity $R_{450}$ at a wavelength of 450 nm of the polarized light separator 7 to reflectivity $R_{650}$ should be at least 1. The above-mentioned coloring can be minimized by using such a polarized light separator. More preferably, the ratio $R_{450}/R_{650}$ should be at least 1.2, permitting further minimization of coloring. Since a ratio $R_{450}/R_{650}$ of over 3.0 can give only a less remarkable effect, the ratio should preferably be less than or equal to 3.0.

Figure 7:
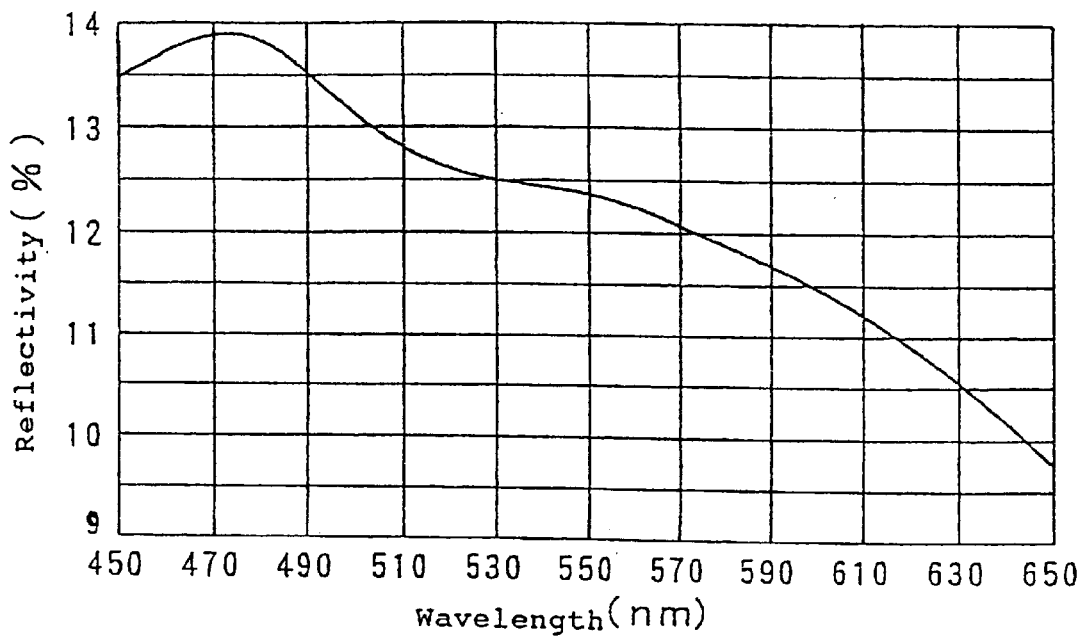
FIG. 7 is a graph illustrating reflectivity of the polarized light separator used in Examples of the invention.

FIG. 7 illustrates reflectivity properties of an example of polarized light separator 7 prepared so as to satisfy the above-mentioned conditions by using the first and the second films 71 and 72 comprising the materials as described above: the ratio $R_{450}/R_{650}$ of reflectivity $R_{450}$ at a wavelength of 450 nm to reflectivity $R_{650}$ at a wavelength of 650 nm is about 1.39.

Any material can be appropriately used as the light absorber 8 shown in FIG. 1 so far as it is black in color for satisfactory light absorption. By forming a number of small holes in the absorber 8 and providing a backlight on the lower surface side, there is available a liquid crystal display device of the transmission type or a combination transmission/reflection type.

A liquid crystal display device free from coloring and giving a good contrast is available as described above by appropriately combining the liquid crystal of the liquid crystal display panel 3, the retardation film 2 and the polarized light separator 7 so as to achieve a ratio $B_{LC}/B_{RF}$ of at least 1.02 of the wavelength dispersion $B_{LC}$ of refractive index anisotropy in the liquid crystal to the wavelength dispersion $B_{RF}$ of retardation in the retardation film 2, and also to achieve a ratio $R_{450}/R_{650}$ of at least 1 of the reflectivity $R_{450}$ at a wavelength of 450 nm of the polarized light separator to the reflectivity $R_{650}$ at a wavelength of 650 nm.

The above-mentioned liquid crystal, retardation film 2 and polarized light separator 6 are examples only. An effect similar to the above is available also by using other liquid crystal, retardation film and polarized light separator.

Figure 8:
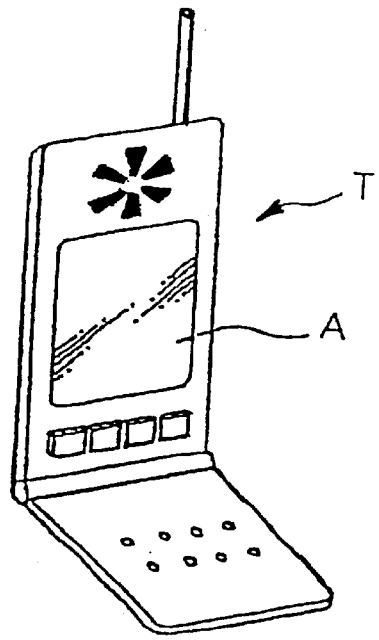
FIG. 8 is a perspective view of a portable telephone to which the liquid crystal display device of the invention is applied.

By applying the above-mentioned liquid crystal display device, for example, to a display section A of a portable telephone T as shown in FIG. 8, it is possible to provide a portable telephone set giving a high display quality, and the device of the invention is not limited to a portable telephone set, but is also applicable to a watch and various other electronic devices.

EXAMPLE 1

The liquid crystal display device as shown in FIG. 1 was prepared as Example 1 of the invention. A uniaxial drawn film comprising PC as shown by c in FIG. 2 ($\Delta n \cdot d = 600$ nm at a wavelength of 589 nm) was used as the retardation film. As the liquid crystal display panel 3, a liquid crystal display panel having a cell thickness of 6.5 μm and a twist angle of 240° was prepared by the use of the liquid crystal E shown in FIGS. 3 and 4 ($\Delta n \cdot d = 0.136$ μm at a wavelength of 589 nm). The ratio $B_{LC}/B_{RF}$ of the wavelength dispersion of refractive index anisotropy of the liquid crystal to the wavelength dispersion of retardation of the retardation film 2 was 1.07. The polarized light separator 7 comprised a lamination of a prescribed number of first films 71 prepared by drawing PEN to five magnifications and second films 72 made of coPEN. The polarized light separator had a reflectivity ratio $R_{450}/R_{650}$ of 1.2.

Comparative Example 1

For comparison purposes with the above-mentioned Example 1, a liquid crystal display device was prepared, as Comparative Example 1, under the same conditions as in Example 1, except that a retardation film made of PA as shown by b in FIG. 2 was employed. The ratio $B_{LC}/B_{RF}$ of the wavelength dispersion of refractive index anisotropy in the liquid crystal of the liquid crystal display panel 3 to the wavelength dispersion of retardation in the retardation film 2 was 1.01, and the polarized light separator 7 had a reflectivity ratio $R_{450}/R_{650}$ of 1.2.

Conventional Examples 1 and 2

Figure 9:
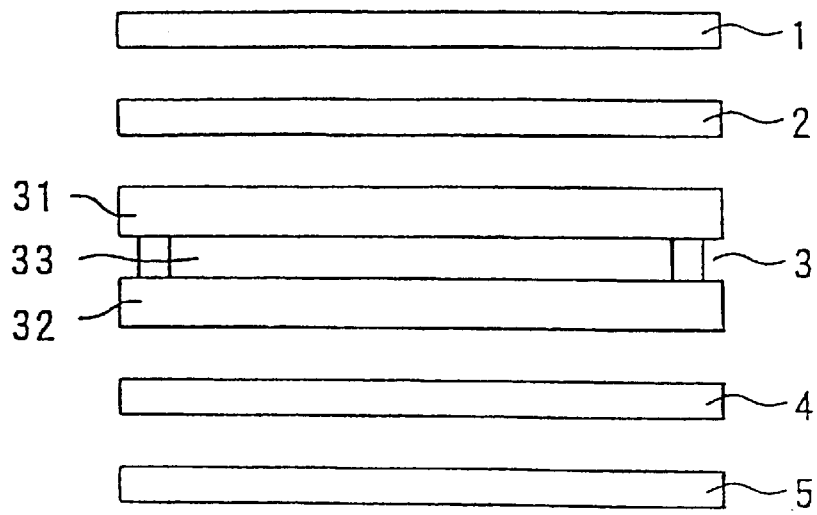
FIG. 9 is a side view of a schematic configuration illustrating an example of a conventional liquid crystal display device.
Figure 10:
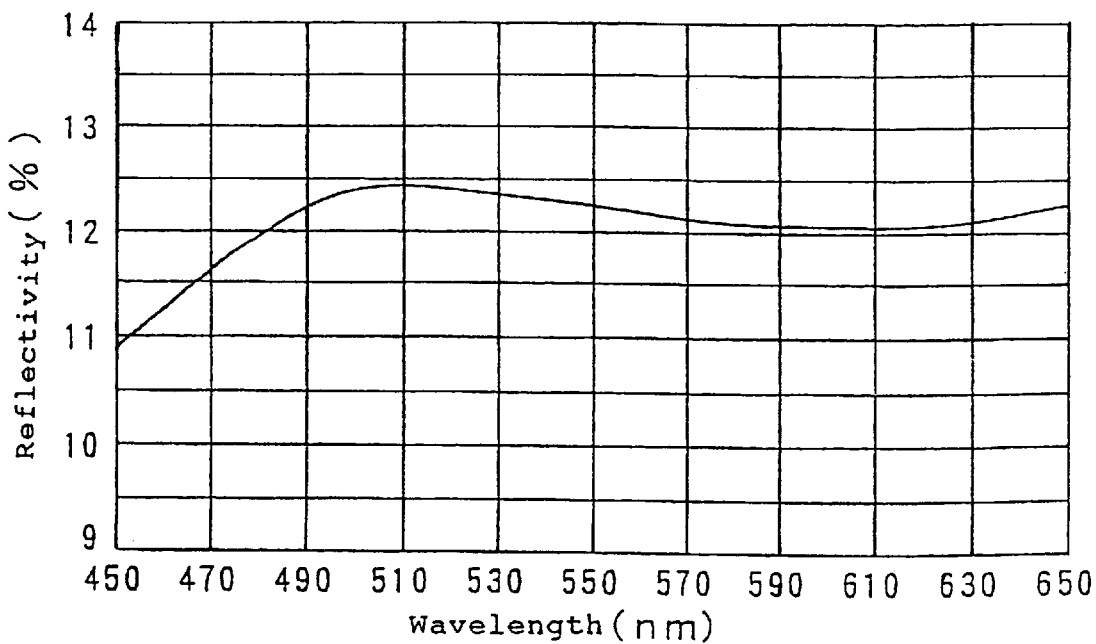
FIG. 10 is a graph illustrating reflectivity of a reflector used in the conventional art.

For comparison purposes with the above-mentioned Example 1 and Comparative Example 1, conventional liquid crystal display devices as shown in FIG. 9 (Conventional Examples 1 and 2) were prepared by using retardation films made of PC and PA, respectively, shown by c and b in FIG. 2, making liquid crystal display panels 3 identical with those in Example 1 and Comparative Example 1, and arranging a polarizer 4 with an aluminum reflector 5 on the lower surface side of the liquid crystal display panel.

Conditions for preparation and results of tests on display properties of the liquid crystal display devices prepared in Example 1, Comparative Example 1, and conventional Examples 1 and 2 are comprehensively shown in Table 1. In the liquid crystal display device using a polarized light separator, the color in the ON-state depends upon the color of the absorber 8 of black. In Example 1 and Comparative Example 1, therefore, the color of the absorber was adjusted so that the color in ON-state becomes black. This was also the case with Example 2 and Comparative Example 2 described later.

TABLE 1

| | Example 1 Polarized separator with black absorber | Comparative Example 1 Polarized separator with black absorber | Conventional Example 1 Polarizer with Al reflector | Conventional Example 2 Polarizer with Al reflector |
|---|---|---|---|---|
| Lower polarized light separator | | | | |
| Liquid crystal wavelength dispersion, $B_{LC}$ | 1.16 | 1.16 | 1.16 | 1.16 |
| Material for retardation film | PC | PA | PC | PA |
| Retardation film dispersion, $B_{RF}$ | 1.08 | 1.15 | 1.08 | 1.15 |
| Wavelength dispersion ratio, $B_{LC}/B_{RF}$ | 1.07 | 1.01 | 1.07 | 1.01 |
| Reflectivity ratio of lower polarized light separator | 1.2 | 1.2 | 0.87 | 0.87 |
| Contrast ratio | 7.4 | 6.3 | 7.2 | 6.1 |
| Color in OFF-state | White | Blue-white | Green | White |
| Color in ON-state | Black | Black | Black | Blue |

In conventional Example 1, coloring was observed in the OFF-state. This was considered to be attributable to a large ratio $B_{LC}/B_{RF}$, and the conditions as described above were selected with a view to bringing the ratio closer to 1 in Conventional Example 2. As a result, although coloring was eliminated in the OFF-state, coloring was caused in the ON-state, leading to a decrease in contrast. In Comparative Example 1, the display was slightly bluish in the OFF-state, with a poorer contrast. In Example 1 of the invention, in contrast, a satisfactory monochromatic display was obtained both in the ON-state and the OFF-state with a good contrast.

EXAMPLE 2

A liquid crystal display device as shown in FIG. 1 was prepared by using a liquid crystal different from that in Example 1 as Example 2 of the invention. With a retardation film 2 identical with that in Example 1, a liquid crystal display panel having a cell thickness of 5.6 μm and a twist angle of 260° was prepared by using a liquid crystal shown by B in FIGS. 3 and 4 (Δn·d=0.164 μm at a wavelength of 589 nm) as the liquid crystal for the liquid crystal display panel 3. The ratio $B_{LC}/B_{RF}$ of the wavelength dispersion of refractive index anisotropy in the liquid crystal to the wavelength dispersion of retardation in the retardation film 2 was 1.10. The polarized light separator 7 comprised a lamination of a prescribed number of first and second films made of the same material as in Example 1, and had a reflectivity ratio of 1.39.

Comparative Example 2

In Comparative Example 2 to be compared with Example 2, a liquid crystal display device was prepared under the same conditions as in Example 2 except for the use of a retardation film comprising PSF as shown by a in FIG. 2. The ratio $B_{LC}/B_{RF}$ of the wavelength dispersion of refractive index anisotropy of the liquid crystal in the liquid crystal display panel 3 to the wavelength dispersion of retardation in the retardation film 2 was 0.98. The polarized light separator 7 had a reflectivity ratio $R_{450}/R_{650}$ of 1.39 just as in Example 2.

Conventional Examples 3 and 4

In Conventional Examples 3 and 4 to be compared with Example 2 and Comparative Example 2, conventional liquid crystal display devices as shown in FIG. 9 were prepared by using retardation films comprising PC and PSF, respectively, shown by c and a in FIG. 2, providing a liquid crystal display panel 3 identical with those in Example 2 and Comparative Example 2, and installing a polarizer 4 with an aluminum reflector 5 on the lower surface side of the liquid crystal display panel.

Conditions of preparation and display performance of the liquid crystal display devices prepared in Example 2, Comparative Example 2 and Conventional Examples 3 and 4 are comprehensively shown in Table 2.

TABLE 2

| Lower polarized light separator | Example 2 Polarized separator with black absorber | Comparative Example 2 Polarized separator with black absorber | Conventional Example 3 Polarizer with Al reflector | Conventional Example 4 Polarizer with Al reflector |
|---|---|---|---|---|
| Liquid crystal wavelength dispersion, $B_{LC}$ | 1.19 | 1.19 | 1.19 | 1.19 |
| Material for retardation film | PC | PSF | PC | PSF |
| Retardation film dispersion, $B_{RF}$ | 1.08 | 1.22 | 1.08 | 1.22 |
| Wavelength dispersion ratio, $B_{LC}/B_{RF}$ | 1.10 | 0.98 | 1.10 | 0.98 |
| Reflectivity ratio of lower polarized light separator | 1.39 | 1.39 | 0.87 | 0.87 |
| Contrast ratio | 10.7 | 9.3 | 10.9 | 8.9 |
| Color in OFF-state | White | Blue-white | Yellow | White |
| Color in ON-state | Black | Black | Black | Blue |

In the liquid crystal display device of Example 2 according to the invention, as is clear from Table 2, coloring was not caused as in Comparative Example 2 and Conventional Examples 3 and 4, and further, a display of a good contrast was obtained. Particularly, in Conventional Example 3, while giving a relatively high contrast, the display was tinted with yellow in the OFF-state, and colored rather seriously. In Conventional Example 4, while the exterior view was white, the ON-state is tinted with blue, resulting in a decrease in contrast. In Comparative Example 2, the display was slightly bluish with a poor contrast. In Example 2 of the invention, on the contrary, a satisfactory monochromatic display was obtained in the ON-state as well as in the OFF-state, with a good contrast.

As a result of application of the above-mentioned liquid crystal display device according to the invention to a display section A of a portable telephone set as shown in FIG. 8 as an electronic device, an excellent display performance was obtained.

According to the liquid crystal display device of the invention and an electronic device using the same, as described above, there is available a display free from coloring with a good contrast, thus bringing about the advantage of providing a liquid crystal display device and an electronic device giving a high display quality.

What is claimed is:
1. A liquid crystal display device comprising:
   a liquid crystal display panel having a liquid crystal layer;
   a polarized light separator, arranged at least on one side of said liquid crystal display panel, having a ratio $R_{450}/R_{650}$ of the reflectivity $R_{450}$ at a wavelength of 450 nm to the reflectivity $R_{650}$ at a wavelength of 650 nm of at least 1;
   wherein said liquid crystal display device has a retardation film for eliminating coloring occurring in said liquid crystal display panel; and
   a ratio of the wavelength dispersion $B_{LC}$ of refractive anisotropy index in said liquid crystal layer to the wavelength dispersion $B_{RF}$ of retardation in said retardation film is at least 1.02.
2. A liquid crystal display device according to claim 1, wherein said ratio $R_{450}/R_{650}$ is less than or equal to 3.
3. A liquid crystal display device according to claim 1, wherein said polarized light separator is provided with a first layer having birefringence and a second layer not having birefringence, and the refractive index of said first layer is substantially equal to the refractive index of said second layer.

4. A liquid crystal display device according to claim 1, wherein said liquid crystal layer is a nematic liquid crystal layer having a twisted alignment within a range of from 180 to 360°.

5. A liquid crystal display device according to claim 1, wherein said retardation film is a polymer film.

6. A liquid crystal display device according to claim 1, wherein a side of said liquid crystal display panel opposite to said polarized light separator is provided with a reflector.

7. An electronic device having a liquid crystal display device as the display section thereof, said liquid crystal display device comprising:

a liquid crystal display panel having a liquid crystal layer;

a polarized light separator, arranged at least on one side of said liquid crystal display panel, having a ratio $R_{450}/R_{650}$ of the reflectivity $R_{450}$ at a wavelength of 450 nm to the reflectivity $R_{650}$ at a wavelength of 650 nm of at least 1;

wherein said liquid crystal display device has a retardation film for eliminating coloring occurring in said liquid crystal display panel; and a ratio of the wavelength dispersion $B_{LC}$ of refractive index anisotrophy in said liquid crystal layer to the wavelength dispersion $B_{RF}$ of retardation in said retardation film is at least 1.02.

8. A liquid cyrstal display device comprising:

a liquid crystal display panel having a liquid crystal layer;

a polarized light separator operatively associated with liquid crystal display panel, said light separator having a reflectivity ratio $R_{450}/R_{650}$ of at least one wherein $R_{450}$ is the reflectivity of said light separator at a wavelength of 450 nm and $R_{650}$ is the reflectivity of said light separator at a wavelength of 650 nm; and a retardation film operatively associated with said liquid cyrstal display panel for eliminating coloring occurring in said liquid cyrstal display panel, wherein a ratio $B_{LC}/B_{RF}$ is at least 1.02 where $B_{LC}$ is the wavelength dispersion of refractive index anisotrophy in said liquid crystal layer and $B_{RF}$ is the wavelength dispersion of retardation in said retardation film.

9. The liquid cyrstal display device of claim 8 wherein said reflectivity ratio $R_{450}/R_{650}$ is less than or equal to 3.

10. The liquid cyrstal display device of claim 8 wherein said polarized light separator includes a first birefringence layer and a second non-birefringence layer, said first layer having a refractive index substantially equal to a refractive index of said second layer.

11. The liquid cyrstal display device of claim 8 wherein said liquid crystal layer is a nematic layer with a twist alignment of 180 to 360°.

12. The liquid cyrstal display device of claim 8 within said retardation film is a polymer film.

13. The liquid cyrstal display device of claim 8 further comprising a reflector disposed on said liquid crystal display panel opposite said polarized light separator.

* * * * *

UNITED STATES PATENT AND TRADEMARK OFFICE
CERTIFICATE OF CORRECTION

PATENT NO. : 5,986,731
DATED : November 16, 1999
INVENTOR(S) : Chiyoaki Iijima

It is certified that error appears in the above-identified patent and that said Letters Patent is hereby corrected as shown below:

Col. 9, line 27, "anisotrophy" should be --anisotropy--.
Col. 10, line 9, "cyrstal" should be --crystal--.
Col. 10, line 10, "cyrstal" should be --crystal--.
Col. 10, line 12, "anisotrophy" should be --anisotropy--.
Col. 10, line 15, "cyrstal" should be --crystal--.
Col. 10, line 17, "cyrstal" should be --crystal--.
Col. 10, line 22, "cyrstal" should be --crystal--.
Col. 10, line 25, "cyrstal" should be --crystal--.
Col. 10, line 25, "within" should be --wherein--.
Col. 10, line 27, "cyrstal" should be --crystal--.

Signed and Sealed this

Thirty-first Day of October, 2000

Attest:

Q. TODD DICKINSON

Attesting Officer

Director of Patents and Trademarks